July 3, 1962 G. K. BUERGEL ET AL 3,042,096
RETRACTABLE SNOW CHAINS
Filed March 7, 1961 3 Sheets-Sheet 1
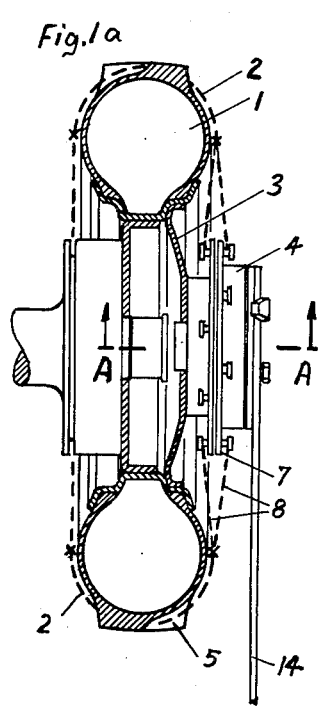
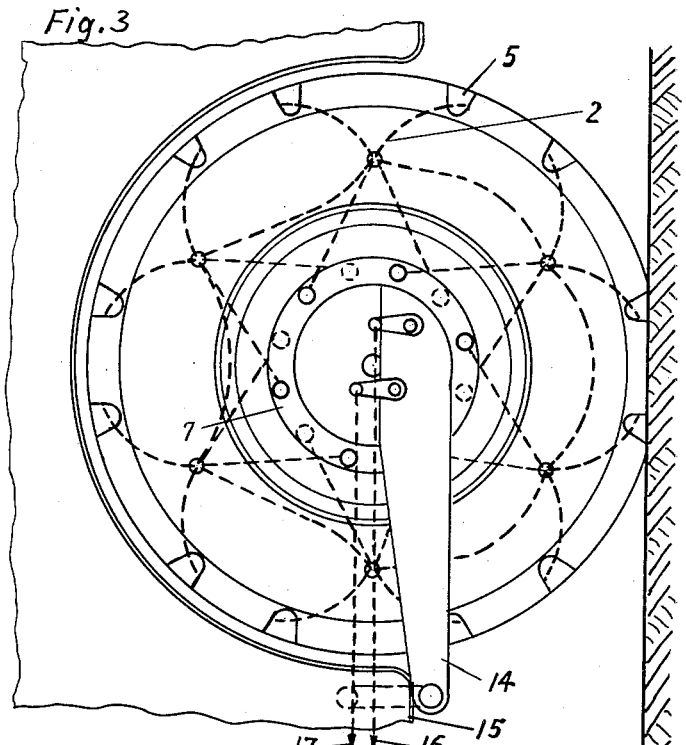
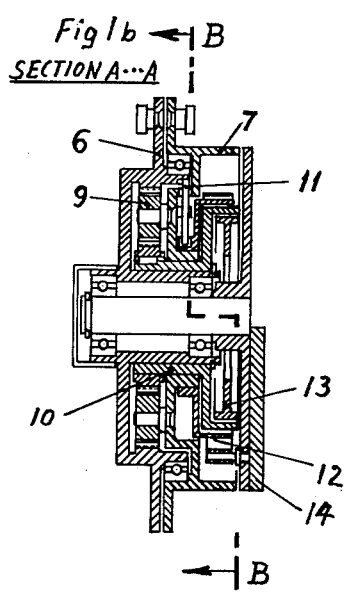
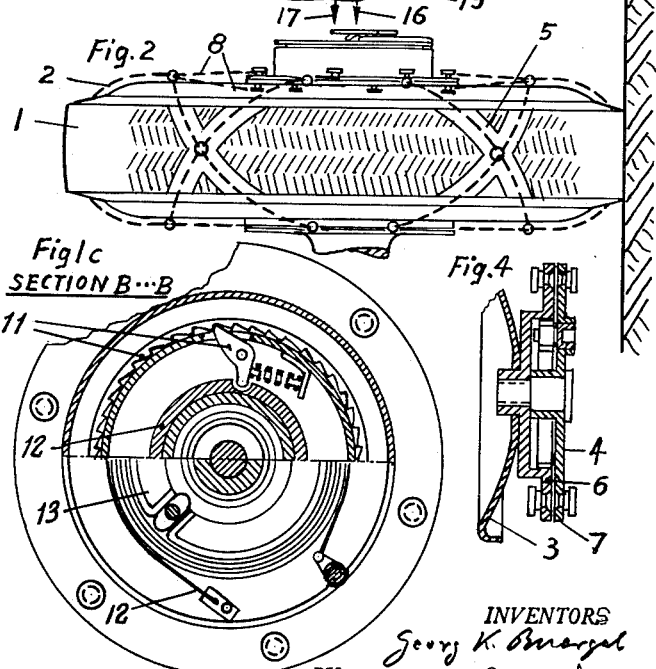
INVENTORS
Georg K. Buergel
Alma Buergel
Edoardo Braggiotti
Mary R. Braggiotti
BY

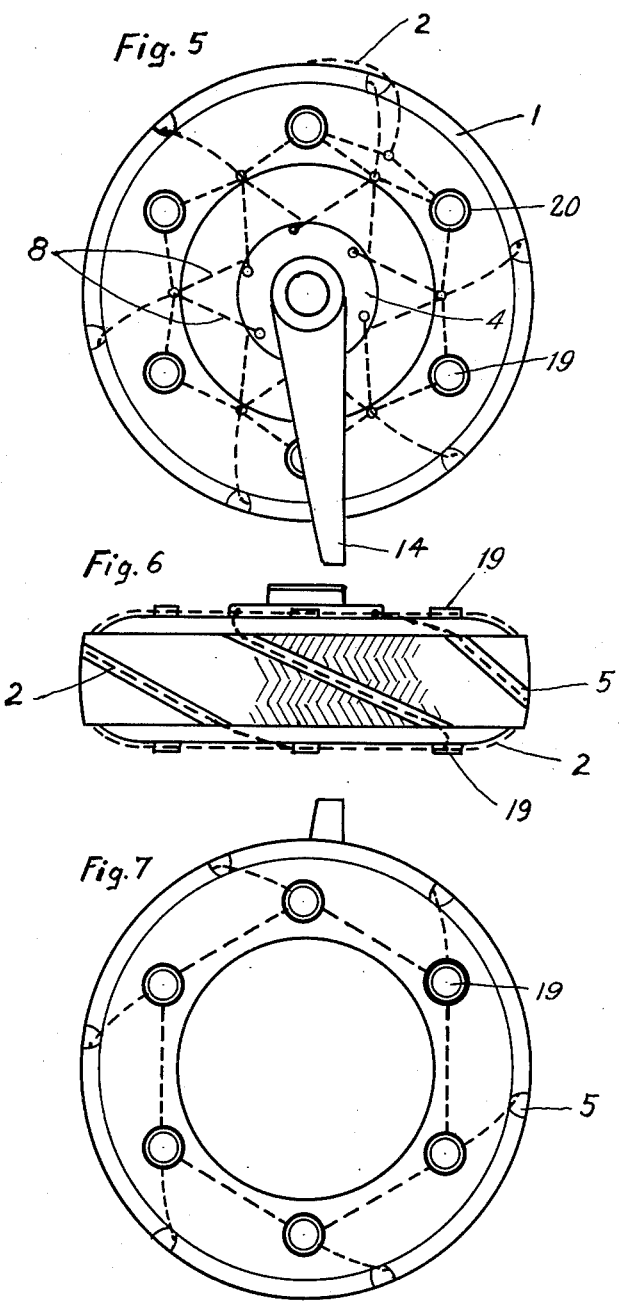

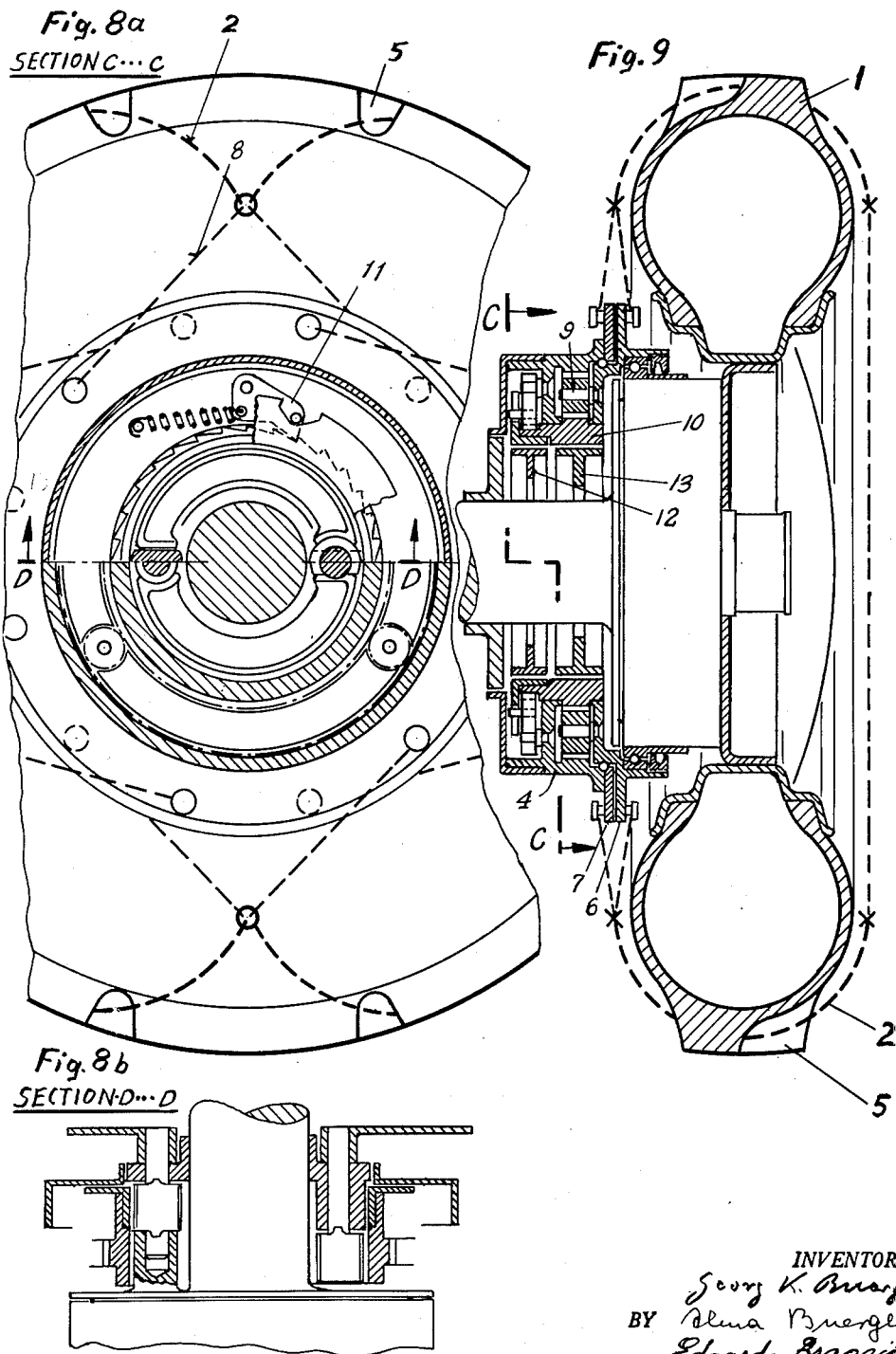

United States Patent Office 3,042,096
Patented July 3, 1962

3,042,096
RETRACTABLE SNOW CHAINS
George K. Buergel and Alma Buergel, both of 6 Stone Road, Plainview, N.Y.; and Edoardo Braggiotti and Mary R. Braggiotti, both of 86—61 208th St., Queens Village, N.Y.
Filed Mar. 7, 1961, Ser. No. 94,060
4 Claims. (Cl. 152—216)

The present invention relates to a combination of snow tires and chains, and in particular to snow chains characterized by a device which enables the driver of the vehicle to retract the chains when no longer needed, or to release the chains when required on snowy or icy pavement without the need of removing or reinstalling the chains. Actuation of these snow chains may be either manually or remotely controlled by the driver of the vehicle from the interior of the vehicle.

It is one object of the present invention to provide vehicular traction on ice or snow by means of a snow tire and chain combination which is simple to make, assemble and efficient in operation.

It is another object of the present invention to provide a snow tire and chain assembly which can be easily attached to or removed from a conventional vehicle.

It is still another object of the present invention to provide such an assembly in which the chains may be retracted when no longer required on snowless or dry pavement, thus providing a smooth normal ride and therefore sparing chains, tires and vehicle.

It is still another object of the present invention to provide such a tire and chain assembly in which the retracted chains may be released when required on snowy and icy or muddy pavement without any other effort than the pulling of a knob, thus providing sufficient traction and skidless driving on such pavement or road.

It is a further object of the present invention to provide such a tire and chain assembly which may be installed at the beginning of the winter season and removed before spring, and which will provide all the advantages of chains in snowy, icy, and muddy conditions and which will eliminate all the disadvantages of driving with chains in normal conditions without any inconvenience of removing or reinstalling the chains as the case may be.

It is still a further object of the present invention to provide a tire and chain assembly which is durable, strong, light weight, efficient, reliable in operation, and relatively inexpensive to produce.

It is another object of the present invention to combine known, reliable, and proven principles in such a way as to provide a new concept in vehicular traction.

Further objects and advantages will become apparent from the following description of the invention taken in conjunction with the figures in which:

FIG. 1a is a top view in cross-section of one embodiment of a vehicle wheel in accordance with the invention claimed herein.

FIG. 1b is a sectional view taken on line A—A of FIG. 1a;

FIG. 1c is a sectional view taken on line B—B of FIG. 1b;

FIG. 2 is a front view of the wheel shown in FIG. 1a turned on its left side;

FIG. 3 is a top plan view of the wheel shown in FIG. 2;

FIG. 4 is a cross-section through a part of the wheel showing a more simplified wrench operated device in accordance with the invention claimed herein.

FIG. 5 is a side view of another embodiment of a vehicle wheel in accordance with the invention claimed showing a variation in chain layout and stabilization method.

FIG. 6 is a front view of the wheel shown on FIGURE 5 showing the variation in tire groove design.

FIG. 7 is an interior side view of the wheel shown on FIGURE 6.

FIGS. 8a, 8b, and 9 represent a modified form of the invention in which the planetary mechanism is shown as an integral part of the wheel and axle.

FIG. 8a is a sectional view taken on the line C—C of FIG. 9;

FIG. 8b is a sectional view taken on the line D—D of FIG. 8a; and

FIG. 9 is a cross section of the wheel.

Reference is now made to the figures, and in particular to FIGS. 1a to 3 which illustrate a first embodiment of a vehicle wheel having the tire and chain assembly in accordance with the claimed invention.

Since at least two assemblies are needed on one vehicle and since both assemblies are identical, only one is shown.

In accordance with the first embodiment of the invention, each tire and chain assembly includes:

A conventional tire 1 with modified tread design on which a suitably patterned chain 2 is attached in a similar manner to that of an ordinary chain. A slightly modified conventional large hub cap 3 carries the retract and release chain mechanism 4.

Tire 1 differs from a standard or snow tire in that it has a tread with a special groove design. These grooves 5 have sufficient depth to allow complete retraction of chains 2 into them. Thus the chains in the retracted position do no protrude beyond the tread of the tire. The shape or pattern of the grooves is such that the pattern of the chains matches that of the grooves in the tightened position. The chain construction is similar to the construction of conventional chains presently used with the exception that it has a diamond shaped pattern to provide stability and prevent misalignment between grooves and chains.

The hub cap 3 is likewise similar to a conventional large type hub cap with provision at the center for mounting the chain retract and release mechanism 4.

The chain retract and release device 4 consist essentially of two discs 6 and 7 connected to the chain 2 by means of chain links or cables 8.

The discs 6 and 7 are connected between each other by means of a planetary gear train 9 which causes opposite rotational movement of the discs when the gearshift 10 is displaced rotationally relatively to the vehicle wheel 1. The discs further have a ratchet mechanism 11 which provides locking of the discs between themselves when the chains have been retracted in the groove of the tread of the tire. The chain retract and release device 4 further consists of a ratchet release brake 12 and a planetary gearshaft brake 13. A torque arm 14 attached to the body 15 of the vehicle provides the reactional forces necessary for the braking actions of the retract and release operations.

Two cables 16 and 17 provide control and actuation of brakes 12 and 13 from the interior of the vehicle.

The principle of operation is as follows:

The chains in the released position are relatively loose. Centrifugal action forces the chains out of their grooves 5, as shown on FIGS. 5 and 6. In this relaxed position the chain pattern does not match the pattern of the tire tread grooves and therefore the chain rides on the tread of the tire outside the grooves in a manner similar to an ordinary snow chain operation, therefore providing the necessary traction.

To retract the chains planetary gearshaft brake 13 is applied by actuation of cable 17. The braking action causes relative motion of the gearshaft 10 with respect to the vehicle wheel 1. This motion through the planetary gear train is transmitted to the discs 6 and 7 causing them to be displaced rotationally in opposite direction thus tightening the chain 2 through the chain or cable links 8. This braking action and therefore tightening of the chain is maintained until the chain, which is always creeping around the circumference of the rolling tire, creeps back into the grooves of the tire. At this point and throughout the retracting operation the discs are prevented from returning to their original position by the ratchet mechanism 11 which provides locking of discs between themselves in one direction only.

With the chains in the grooves of the tread of the tire, operation of the vehicle is identical to an ordinary one with standard or snow tires.

Creeping of the chains in the tire grooves may be accelerated by the addition of rollers in the chain links thus speeding up the retraction operation.

To release the chains, release brake 12 is applied by means of release cable 16. This brake releases the ratchet mechanism 11 thus breaking the locking connection between the two discs. Centrifugal action forces the chains out of their grooves pulling against the chain links 8 and therefore returning the discs to their original position, thus completing a cycle operation.

Obvious advantages are the following:

(1) Use of a combination of standard, reliable and proven principles of vehicular traction (snow tires and snow chains).

(2) Use of sound mechanical principles for the operation of the retract and release mechanism.

(3) Easy adaptability to present vehicles without any major modification.

(4) Easy installation.

(5) Elimination of the inconvenience of installing and removing of the conventional chains several times a year.

(6) Increase of safety due to the ease of use of this traction device especially on icy, snowy or muddy stretches of the road.

(7) Instant release and retraction of chains.

(8) Saving of tires and chains.

(9) Saving of vehicle body from unnecessary vibration due to driving with chains on normal road.

(10) Resuming of normal speed of vehicles on dry normal stretches of the road.

(11) Economy due to the ability of using these tires as ordinary tires, when they are worn to the point that the grooves are not sufficiently deep to allow complete retraction of the chains.

While the preferred form of construction for carrying the invention into effect is illustrated and described above, it is capable of variation and modification, without departing from the spirit of the invention.

Some variations and modifications are briefly described below:

In the embodiment shown on FIG. 4 the release and retract mechanism is shown to be operated manually. That is the discs are displaced by means of a wrench or a crank operated by the driver when the vehicle is stationary. This is a simpler, inexpensive method of operation of the retraction and release of the chains.

In the embodiment shown on FIGS. 5, 6, and 7 a modification of tread groove design and chain pattern is shown. The diagonal pattern of the chain resembles more the conventional chain design. However, since chain form stabilization is required for proper retraction of the chains into the grooves, bumps (19) must be incorporated into the tire to receive chain rings (20). Since this diagonal chain pattern is unstable by itself, retraction of chains into the grooves is accomplished by preventing chain creeping by means of the bumps (19) and chain rings (20) therefore establishing stabilization of the system and enabling instant retraction.

In the embodiment shown on FIGS. 8a and 9, the release and retract mechanism is shown as an integral part of the vehicle in contrast to the above described devices which are in the form of an attachment or an optional piece of equipment. The integral device is substantially identical in principle with the exception of some minor modifications for adaptability as an integral part of the vehicle. This construction makes possible the use of retractable chains also on front wheels.

It is intended that all matter contained in the above descriptions or shown in the accompanying drawings shall be interpreted as illustrative and not in limiting sense.

What is claimed is:

1. A tire and chain unit structure comprising a rotating wheel of a vehicle including a tire, a chain unit mounted upon the tire having a pair of rim chains one adjacent each side of the tire and having a plurality of uniformly spaced chains traversing the tread of the tire and connected at opposite ends to the rim chains, the traversing chains having a stable position relative to the rim chains, a plurality of grooves in the tread of the tire each adapted to fully receive therein one of the traversing chains, the chain unit having a first condition wherein the traversing chains rest upon the surface of the tread out of registered relation to the grooves, and a second condition wherein the traversing chains are registered with and fully received in the grooves, means for exerting a constant radially directed retracting force upon the chain unit while the latter is in its first condition, and the chain unit having in said first condition creeping movement over the surface of the tread as the tire rotates, so that upon the traversing chains creeping over the tire tread into register with the next adjacent grooves they are drawn by the retracting force radially into the grooves.

2. The structure as in claim 1, wherein the traversing chains are arranged between the rim chains in uniformly spaced pairs of diagonally extending intersecting chains, and wherein the grooves are of complementary pattern.

3. The structure as in claim 1, wherein the said means for exerting said retracting force is manually operable.

4. The structure as in claim 1, wherein the said means for exerting the retracting force includes a pair of discs rotatively supported axially of the chain unit, separate cable means connecting the discs with one of the rim chains, the discs having rotative movement relative to one another in one direction tending to exert a retracting force upon the cables, and having rotative movement relative to one another in an opposite direction tending to relax the said retracting force, and manipulative means for effecting selective rotation of the discs relative to one another.

References Cited in the file of this patent
UNITED STATES PATENTS

| | | |
|---|---|---|
| 2,188,120 | Smith | Jan. 23, 1940 |
| 2,561,910 | Coffey | July 24, 1951 |
| 2,913,033 | Sharpe | Nov. 17, 1959 |